(12) United States Patent
Daniali et al.

(10) Patent No.: US 12,418,081 B2
(45) Date of Patent: Sep. 16, 2025

(54) DEVICE AND METHOD FOR MEASURING THE TEMPERATURE OF A COOLING MEDIUM FOR AN INVERTER, INVERTER WITH SUCH A DEVICE

(71) Applicant: ZF Friedrichshafen AG, Friedrichshafen (DE)

(72) Inventors: Navid Daniali, Pegnitz (DE); Johannes Hager, Marktleugast (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 756 days.

(21) Appl. No.: 17/512,934

(22) Filed: Oct. 28, 2021

(65) Prior Publication Data
US 2022/0140455 A1    May 5, 2022

(30) Foreign Application Priority Data
Oct. 29, 2020 (DE) .......................... 102020213626.2

(51) Int. Cl.
| | |
|---|---|
| *H01M 50/569* | (2021.01) |
| *B60W 20/20* | (2016.01) |
| *H01M 50/519* | (2021.01) |

(52) U.S. Cl.
CPC ....... *H01M 50/569* (2021.01); *H01M 50/519* (2021.01); *B60W 20/20* (2013.01)

(58) Field of Classification Search
None
See application file for complete search history.

(56) References Cited

U.S. PATENT DOCUMENTS

| | | |
|---|---|---|
| 2002/0006154 A1 | 1/2002 | Nada |
| 2005/0204761 A1 | 9/2005 | Karikomi et al. |
| 2015/0049527 A1 | 2/2015 | Sugahara et al. |
| 2015/0211938 A1 | 7/2015 | Imakire et al. |

FOREIGN PATENT DOCUMENTS

| | | |
|---|---|---|
| DE | 10 100 48 704 A1 | 5/2002 |
| DE | 10 2006 018 771 A1 | 10/2007 |

OTHER PUBLICATIONS

Office Action dated Jun. 24, 2021 for German Patent Application No. 10 2020 213 626.2, (10 pp.), note: pp. 1 and 2 are English language Explanations to Section C. Result of Determination Document.

*Primary Examiner* — Carlos Barcena
(74) *Attorney, Agent, or Firm* — Crowell & Moring LLP

(57) ABSTRACT

A method for measuring a temperature of a coolant in a power module may include measuring a first temperature with a first temperature sensor and measuring a second temperature with a second temperature sensor. The method may include calculating a difference between the first temperature and second temperature, identifying one or more thermal resistances and one or more thermal capacitances with a thermal circuit corresponding to the power module and based on the calculated difference and at least one power loss in the power module. The method may further include determining the temperature of the coolant from the identified thermal resistances, thermal capacitances, the at least one power loss, and at least one of the two temperatures.

7 Claims, 3 Drawing Sheets

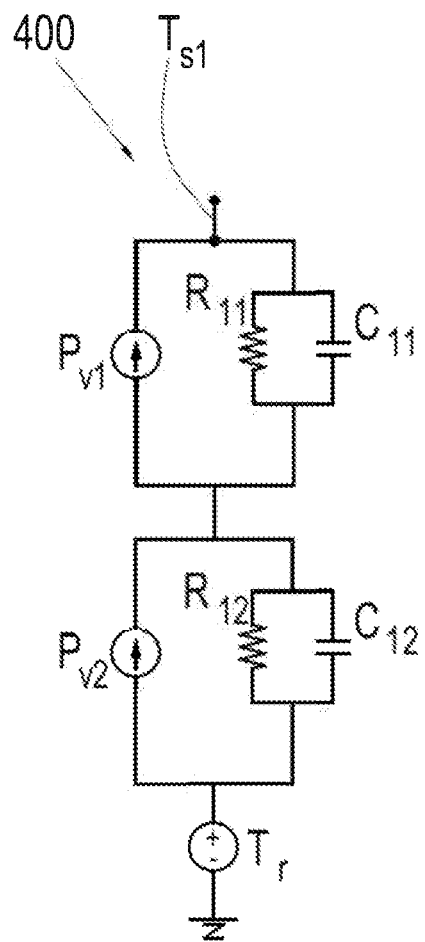 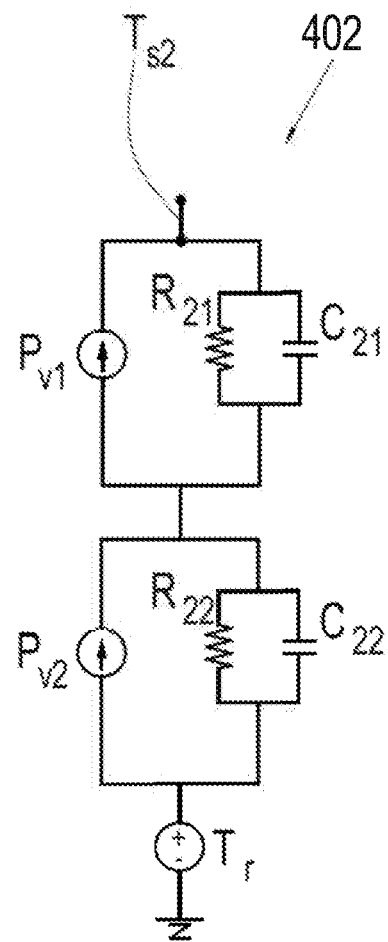
Fig. 5A                    Fig. 5B

DEVICE AND METHOD FOR MEASURING THE TEMPERATURE OF A COOLING MEDIUM FOR AN INVERTER, INVERTER WITH SUCH A DEVICE

RELATED APPLICATION

This application claims the benefit of, and priority to, German Patent Application DE 10 2020 213 626.2, filed Oct. 29, 2020, which is hereby incorporated by reference herein in its entirety.

TECHNICAL FIELD

The present disclosure relates to the field of electric mobility, in particular power modules for operating an electric drive for a vehicle.

BACKGROUND

Power modules, in particular integrated power modules, are increasingly being used in motor vehicles. These power modules are used, e.g. in DC/AC inverters, which supply electric machines such as electric motors with a multi-phase alternating current. In doing so, a direct current from a DC power source, e.g. a battery, is converted to a multi-phase alternating current. The power modules are based on power semiconductors, in particular transistors such as IGBTs, MOSFETs and HEMTs.

In high powered applications, i.e. 400V or 800V applications, these power modules produce correspondingly large amounts of heat. This heat must be discharged in order to prevent overheating in the power switches, which can impair the functionality of the power modules, or the inverters. A heatsink, with which the power switch is in thermal contact, is used in the power module for this. A coolant, such as cooling water, is used in the heatsink for this, by means of which the heat generated in the power module is discharged.

To ensure the cooling function of the heatsink, and thus the functionality of the power module, it is advantageous to obtain some insight into the cooling power of the coolant. The temperature of the coolant is measured for this. Precise temperature measurement, however, is not always possible. With power modules and inverters from the prior art, a temperature sensor is placed in the proximity of the coolant. Because the temperature sensor is not placed directly in the coolant, the temperature is not measured directly by the temperature sensor. This therefore requires a computational adjustment of the temperature measurement results. Computing methods based on models are frequently used for this. The precision of such a temperature measurement is limited because the basic conditions for these model-based computing methods change frequently in the course of the service life of the power module. Furthermore, these model-based computing methods are extremely sensitive to tolerances in calculated losses and to measured temperatures, as well as to tolerances in the basis model. This also reduces the precision of these methods.

BRIEF DESCRIPTION OF THE DRAWINGS

Certain aspects and embodiments are described below with reference to the following figures. Generally, the same reference symbols relate to identical or similar reference parts in the figures.

FIG. 5A shows a schematic illustration of another Foster network regarding a first temperature sensor in the power module with two loss sources; and FIG. 5B shows a schematic illustration of another Foster network regarding a second temperature sensor in the power module with two loss sources.

DETAILED DESCRIPTION

Figure 1:
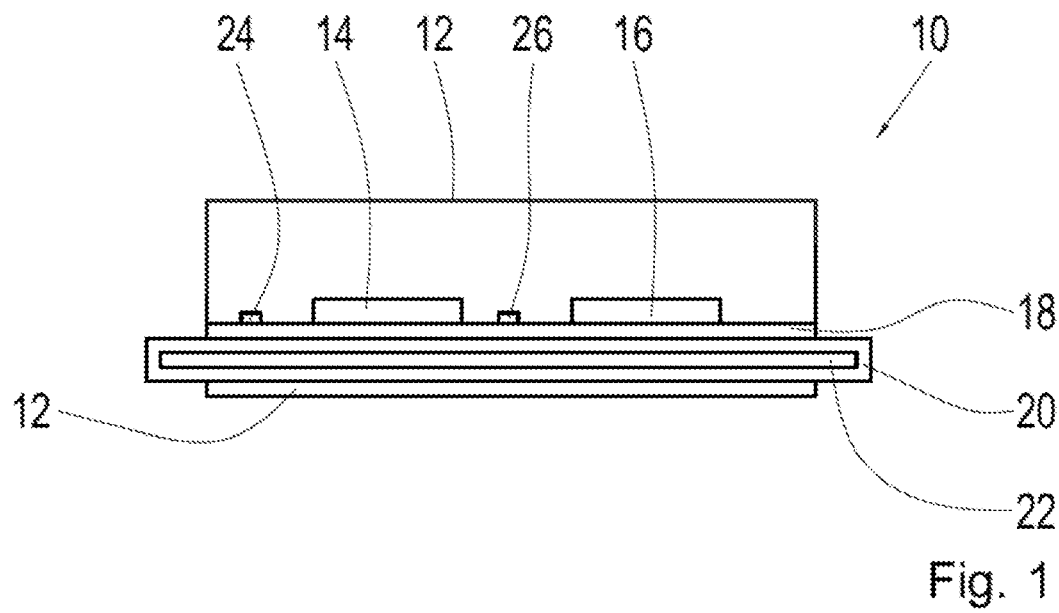
FIG. 1 shows a schematic illustration of a power module according to one embodiment, in a side view.

In view of the background discussed above, an object of the present embodiments is to produce a system for more precisely and reliably measuring the temperature of the coolant for an inverter.

The system in the framework of one aspect comprises a processor configured to execute the method. The method is used to measure the temperature of a coolant in a power module. In the framework of this invention, the power module is used to operate an electric drive in a vehicle, in particular an electric vehicle, and/or a hybrid vehicle. The power module is preferably used in a DC/AC inverter. In particular, the power module is used to supply electricity to an electric machine, e.g. an electric motor and/or generator. A DC/AC inverter is used to generate a multi-phase alternating current from a direct current generated by a DC power source, e.g. a battery.

The power module has an input contact with a positive pole and a negative pole for receiving an input current (direct current). When the power module is in operation, the positive pole is electrically connected to a positive connection on the battery, and the negative pole is electrically connected to a negative connection on the battery.

The power module also has numerous power switches, connected in parallel to damper capacitances. These semiconductor-based power switches are used to generate an output current based on the input current by means of controlling the individual power switches. The control of the power switches can be based on a so-called pulse-width modulation.

A bridge circuit assembly is preferably formed by the power switches. The bridge circuit assembly can comprise one or more bridge circuits in the form of half-bridges. Each half-bridge comprises a high-side switch (HS switch) and a low-side switch (LS switch) connected in series to the high-side switch. Each half-bridge is assigned a phase of the multi-phase alternating current (output current). The HS switch and/or the LS switch comprise one or more power semiconductor components, e.g. IGBT, MOSFET, or HEMT. The fundamental semiconductor material for the HS switch and LS switch preferably comprises a so-called wide-bandgap semiconductor (semiconductor with a large bandgap) such as silicon carbide (SiC) or gallium nitride (GaN).

The power module also contains a heatsink for discharging heat generated in the power module, in particular the power switches, with high input currents. The heatsink can be made of aluminum and/or an aluminum alloy. A coolant flows through the heatsink, such as cooling water. The coolant is in thermal contact with the components in the power module that generate heat, e.g. the power switches, in order to withdraw this heat.

A first temperature sensor for measuring a first temperature and a second temperature sensor for measuring a second temperature are located in the power module. The measured first or second temperature is an indication of the actual temperature in the coolant, but is not the same as the latter. The method according to this aspect is designed to determine the actual temperature of the coolant based on the first temperature and the second temperature. The difference between the first temperature and second temperature is first calculated for this. Furthermore, at least a power loss in the power module (such as the power loss of the high-side switch, obtained by adding the switching loss and power loss) is also obtained, preferably as a predefined value. The at least one power loss relates to the difference in the measured temperatures due to various loss sources, such as those of the power switch in the power module. One or more thermal resistances and one or more thermal capacitances are identified on the basis of the calculated difference and the at least one power loss. This takes place by means of a thermal circuit corresponding to the power module. The thermal circuit can comprise a thermal network, which can be a Foster network or a Cauer network. The thermal circuit preferably comprises numerous thermal networks, wherein each of the two temperature sensors is assigned a corresponding thermal network. For each of the two temperature sensors, the thermal network can in turn comprise thermal sub-networks, each of which is assigned to one of numerous loss sources.

The actual temperature of the coolant is then determined from the identified thermal resistances, the identified thermal capacitances, the at least one power loss and one of the first or second temperatures. There is a correlation between these various values, based on which the actual temperature of the coolant can be calculated. The relevant differential equations are solved for the time period to determine the transient and stationary effects of the thermal networks. The at least one power loss serves as the realtime input for the differential equations for thermal networks. The coolant temperature is obtained from the difference between one of the first and second measured temperatures and the sum of the calculated delta-temperatures corresponding to the loss sources, which are obtained by solving the differential equations for the thermal networks.

This results in a method with which the actual temperature of the coolant can be determined with greater precision. By obtaining the difference between the temperatures measured by means of the temperature sensors, those interference factors that can be attributed to loss sources and are likewise integrated in the measurement values of the temperature sensors, are eliminated in a first approximation.

FIG. 1 shows a schematic illustration of a power module 10. The power module 10 comprises a housing 12 in which numerous power switches 14, 16 are located. The power switches 14, 16 are semiconductor electronic components in the form of a MOSFET or IGBT. The semiconductor materials in the power switches 14, 16 can be so-called wide-bandgap semiconductors, such as SiC or GaN. The power module 10 also comprises a substrate 18 for the power switches 14, 16. There is also a heatsink 20 for discharging the heat generated in the power switches 14, 16. The heatsink 20 comprises and interior chamber through which a coolant 22 flows, which enters the interior chamber via an intake and exits through an outlet.

A first temperature sensor 24 and second temperature sensor 26 are attached to the power module 10 to measure the temperature of the coolant 22. The first temperature sensor 26 delivers a first temperature 104 and the second temperature sensor 26 delivers a second temperature 106 in interacting with the device 100 schematically shown in FIG. 2. The first temperature and second temperature are measured temperature values that reflect the actual temperature in the coolant 22, although they are not exactly the same. To determine the actual temperature of the coolant 22, a difference 105 between the first temperature 104 and second temperature 106 is obtained by means of a calculating unit 108. Furthermore, at least one power loss 102 (such as the power loss at the high-side switch) in the power module 10 is obtained, preferably as a predefined value. The at least one power loss 102 relates to the difference between the measured temperature values and the actual, sought temperature of the coolant 22, due to various loss sources, such as the power switches 14, 16 in the power module 10. The difference 105 and the power loss 102 are input in an identification unit 110. This serves as a system identification, in particular to identify one or more thermal resistances and one or more thermal capacitances (see FIGS. 3-5) by means of a thermal circuit corresponding to the power module 10 (see FIGS. 3-5), based on the calculated difference 105 and at least one power source 102 in the power module 10.

The thermal circuit preferably comprises numerous thermal networks, each of which is assigned one of the numerous temperature sensors 14, 16 and the determined loss sources. The respective thermal network can be a Foster network or a Cauer network. As is shown by way of example in FIGS. 3A, B, the thermal network comprises a first Foster network 200 for the first temperature sensor 14, and the thermal network for the second temperature sensor 16 comprises a second Foster network 202. The first Foster network 200 contains a first thermal resistance R1 and first thermal capacitance C1. In addition to the first thermal resistance R1 and first thermal capacitance C1, there is also a power loss Pv between the first temperature Ts1 and the sought, actual temperature Tr, which form interference factors. These interference factors have an effect on the measured first temperature Ts1, and result in a difference between it and the sought temperature Tr. The second Foster network 202 contains a second thermal resistance R2 and a second thermal capacitance C2. In addition to the second thermal resistance R2 and second thermal capacitance C2, there is also a power loss Pv between the second temperature Ts2 and the sought, actual temperature Tr, which form interference factors. These interference factors have an effect on the measured second temperature Ts2, and result in a difference between it and the sought temperature Tr. The power loss can be measured or estimated.

Figure 4:
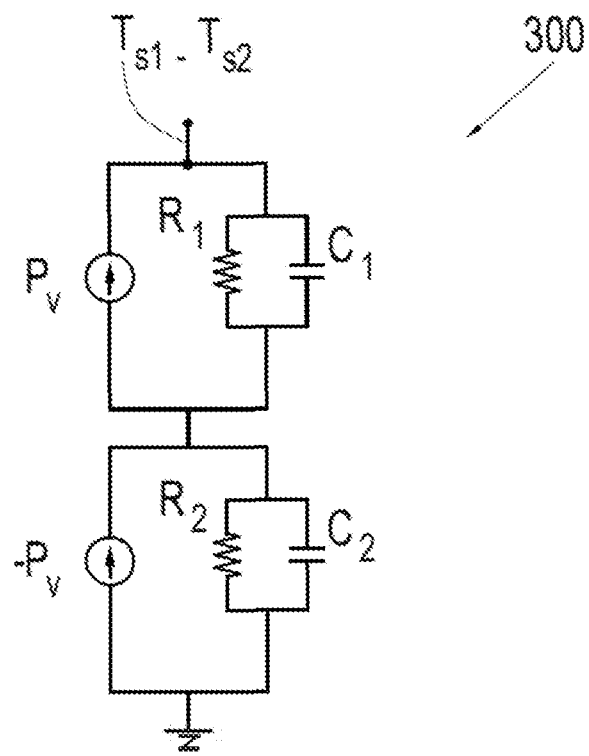
FIG. 4 shows a schematic illustration of a Foster network regarding a the difference in the two measurement values of the two temperature sensors.

Another thermal network regarding obtaining the difference between the first and second temperatures Ts1, Ts2 is shown in FIG. 4. This thermal network serves as the basis for defining the discreet differential equations. By solving an equation system that contains the sought unknown parameter, and is formed by discreet differential equations and operating point information (such as the realtime values for measured temperatures and calculated losses), numerous parameters 114 (see FIG. 2) can be determined for the thermal circuit, specifically the thermal resistances R1, R2 and the thermal capacitances C1, C2. The number of equations in the equation system is equal to or greater than the number of parameters 114 for the thermal circuit, preferably significantly greater than the latter. Methods such as the method of least squares, can be used to solve the equation system. These measures increase the precision of the parameters 114 determined in this manner.

Figure 2:
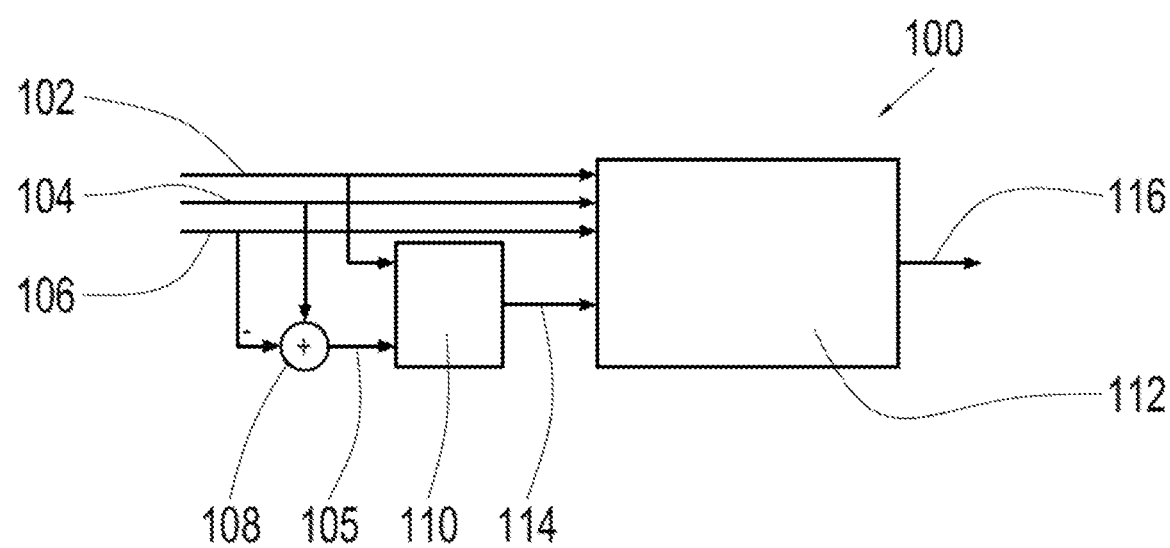
FIG. 2 shows a schematic block diagram of a device for measuring temperatures according to one embodiment.
Figures 3A, 3B:
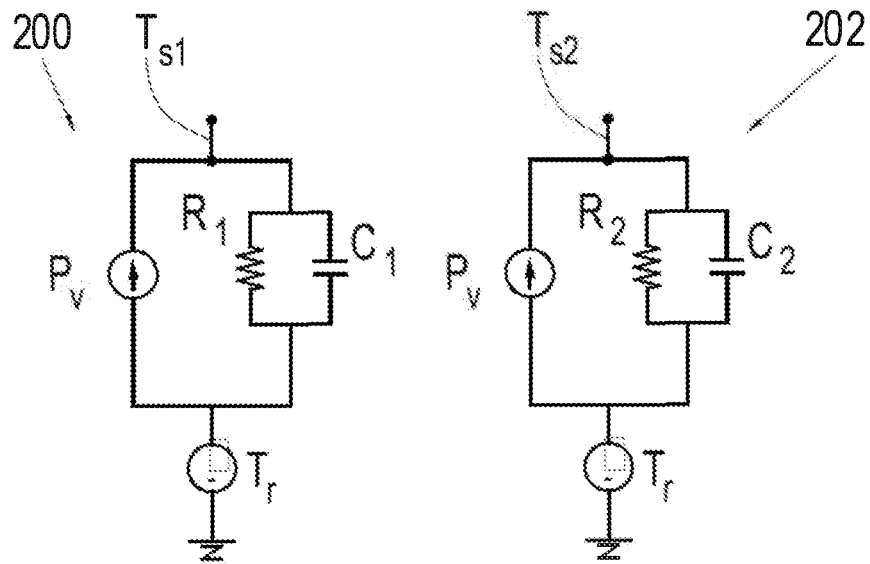
FIG. 3A shows a schematic illustration of a Foster network regarding a first temperature sensor in the power module with a loss source.
FIG. 3B shows a schematic illustration of a Foster network regarding a second temperature sensor in the power module with a loss source.

There is only a power loss Pv in the example described in reference to FIGS. 2-3. If there are numerous power sources, numerous power losses must be taken into account. As shown by way of example in FIGS. 5A-B, each temperature sensor 14, 16 is assigned a corresponding thermal network 400, 402, which are Foster networks in this case. Each Foster network comprises in turn numerous sub-networks, each of which is assigned one of the power losses Pv1, Pv2. The number of thermal resistances R11, R12, R21, R22 and thermal capacitances C11, C12, C21, C22 is therefore also increased.

Only one RC link is shown in each Foster network in FIGS. 3-5, which corresponds to a loss source. The number of RC links that each correspond to a loss source can also be greater, to increase the precision of the system identification and thus the precision of the estimation of the coolant temperature.

The parameter 114 obtained using the identification unit 110, the first and second temperatures 104, 106, and the power loss 102 are entered in an estimation unit 112 in FIG. 2, which then determines the actual temperature 116 on the basis of these values. The computing module forming the basis for the estimation unit 112 can be, e.g., equation (1) or (2):

$$T_r = T_{s1} - \Delta T_1 \quad (1)$$

$$T_r = T_{s2} - \Delta T_2 \quad (2)$$

$\Delta T_1$ and $\Delta T_2$ are the resulting dynamic temperatures, which are the realtime results of the solutions for the relevant differential equations in the time period. The at least one power loss Pv serves as the realtime input for the differential equations for thermal networks and generates realtime temperature effects on the temperatures $\Delta T_1$ and $\Delta T_2$.

REFERENCE SYMBOLS 10 power module
12 housing
14, 16 power switches
18 substrate
20 heatsink
22 coolant
24 first temperature sensor
26 second temperature sensor
100 device
102 power loss
104 first temperature
106 second temperature
108 calculating unit
105 difference
110 identification unit
112 estimation unit
114 parameter
116 actual coolant temperature
200, 202, 300, 400, 402 thermal network

We claim:

1. A method for measuring a temperature of a coolant flowing through a heatsink in a power module to ensure a cooling function of the heatsink, wherein temperature sensors are not placed in direct contact with the coolant, and wherein a first temperature sensor for measuring a first temperature and a second temperature sensor for measuring a second temperature are located in the power module and not in direct contact with the coolant, the method comprising:
   calculating a difference between the first temperature and second temperature;
   determining one or more thermal resistances and one or more thermal capacitances with a thermal circuit corresponding to the power module, based on the calculated difference, and based on at least one power loss in the power module, wherein the thermal circuit comprises at least one thermal network comprising at least one Foster network and/or at least one Cauer network, and wherein the one or more thermal resistances and the one or more thermal capacitances are determined by solving an equation system formed by discreet differential equations for the at least one thermal network and operating point information; and
   determining the temperature of the coolant based on a difference between at least one of the first temperature and the second temperature and a delta-temperature that is based on the one or more thermal resistances, the one or more thermal capacitances, and the at least one power loss.

2. The method according to claim 1, wherein the thermal circuit comprises a first thermal network assigned to the first temperature sensor and a second thermal network assigned to the second temperature sensor.

3. The method according to claim 1, wherein a number of equations in the equation system is equal to or greater than a number of thermal resistances and thermal capacitances.

4. A non-transitory computer-readable medium having stored thereon program code that, when executed by at least one processing device, cause the at least one processing device to execute the method according to claim 1.

5. A power module for a vehicle for measuring a temperature of a coolant in the power module in the absence of temperature sensors in direct contact with the coolant in proximity to the power module, the power module comprising:
   a first temperature sensor within the power module and configured to measure a first temperature of the power module;
   a second temperature sensor within the power module and configured to measure a second temperature of the power module;
   circuitry including at least one processing device and at least one thermal circuit, wherein the thermal circuit comprises at least one thermal network comprising at least one Foster network and/or at least one Cauer network, wherein the circuitry is configured to:
   calculate a temperature difference between the first temperature and second temperature;
   determine a thermal resistance based on the temperature difference and at least one power loss in the power module;
   determine a thermal capacitance based on the temperature difference and the at least one power loss in the power module,
      wherein the thermal resistance and the thermal capacitance are determined using the thermal circuit by solving an equation system formed by discreet differential equations for the at least one thermal network and operating point information; and
   determining the temperature of the coolant based on a difference between at least one of the first temperature and the second temperature and a delta-temperature that is based on the thermal resistance, the thermal capacitance, and the at least one power loss.

6. The power module according to claim 5, wherein the thermal circuit comprises a first thermal network assigned to the first temperature sensor and a second thermal network assigned to the second temperature sensor.

7. The power module according to claim 5, wherein a number of equations in the equation system is equal to or greater than a number of thermal resistances and thermal capacitances.

\* \* \* \* \*